July 22, 1958 L. G. LOMBI 2,844,362
DOUGH MIXING AND KNEADING MACHINE
Filed July 31, 1956 2 Sheets-Sheet 1
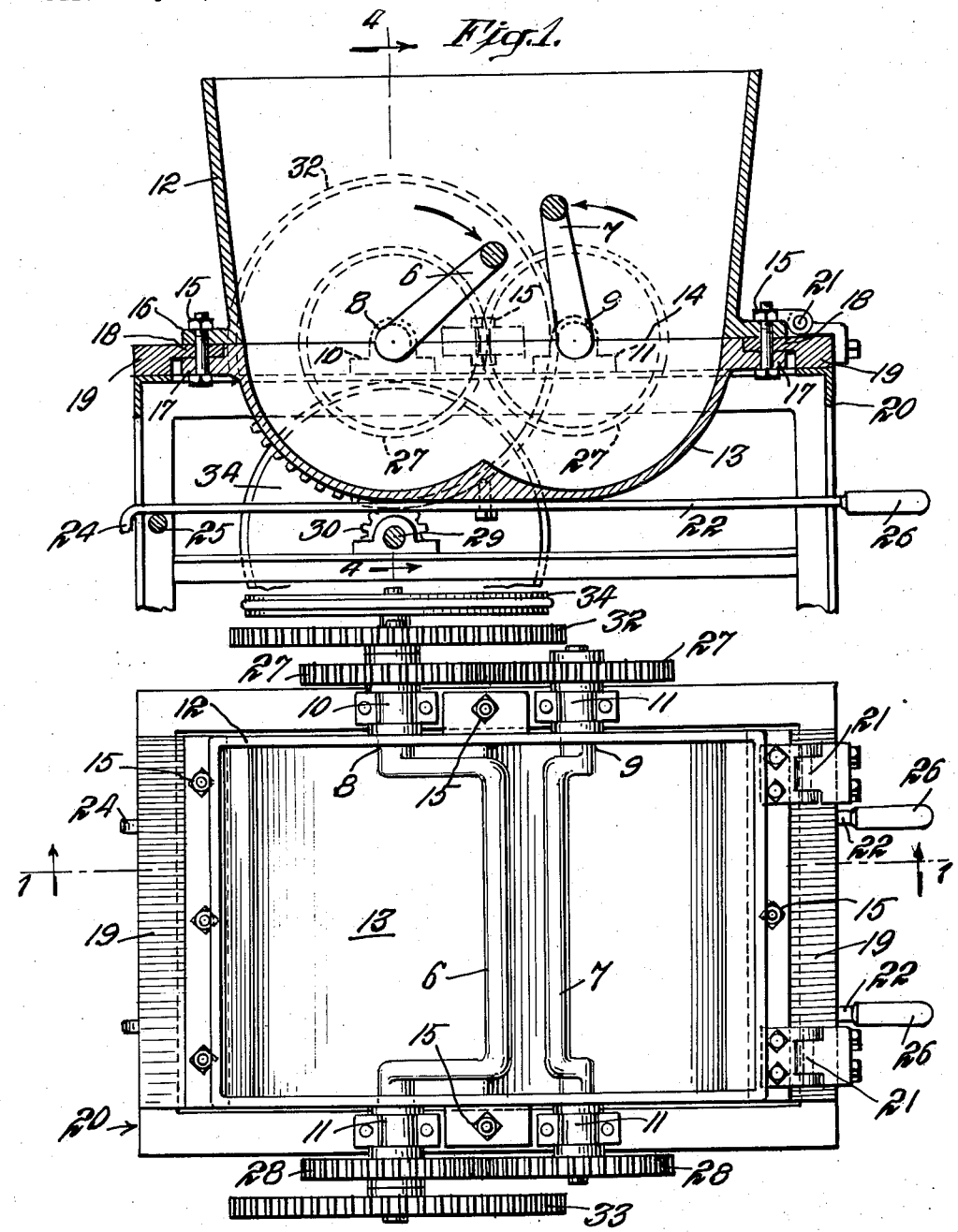
INVENTOR.
LOUIS G. LOMBI
BY
ATTORNEY July 22, 1958

L. G. LOMBI 2,844,362

DOUGH MIXING AND KNEADING MACHINE

Filed July 31, 1956

INVENTOR.
LOUIS G. LOMBI
BY
ATTORNEY

United States Patent Office 2,844,362
Patented July 22, 1958

2,844,362

DOUGH MIXING AND KNEADING MACHINE

Louis G. Lombi, West Englewood, N. J.

Application July 31, 1956, Serial No. 601,261

1 Claim. (Cl. 259—104)

The invention herein disclosed relates to the mixing and kneading of dough and the general objects of the invention are to provide a machine of simple, practical construction, which will effect quick blending and thorough kneading and which will accomplish these effects all in one operation instead of requiring two machines, a mixer and a dough brake as heretofore.

Particular objects of the invention are to facilitate cleaning and servicing operations and to make these operations so simple and easy that they may be accomplished by a single person.

Other important objects of the invention are to provide a machine safe to operate and of well balanced construction, quiet in action and economical in power requirements.

The objects mentioned and other desirable objects have been attained through novel features of construction, combination and relation of parts, all as will appear in the course of the following specification.

The drawings accompanying and forming part of the specification illustrate a present practical embodiment of the invention, but structure may be modified and changed as regards immediate illustration, all within the true intent and scope of the invention as hereinafter defined and claimed.

Fig. 1 in the drawings is a broken vertical sectional view of one of the mixing and kneading machines, this view being taken as on substantially the plane of line 1—1 of Fig. 2.

Fig. 2 is a top plan view of the machine.

Figure 3:
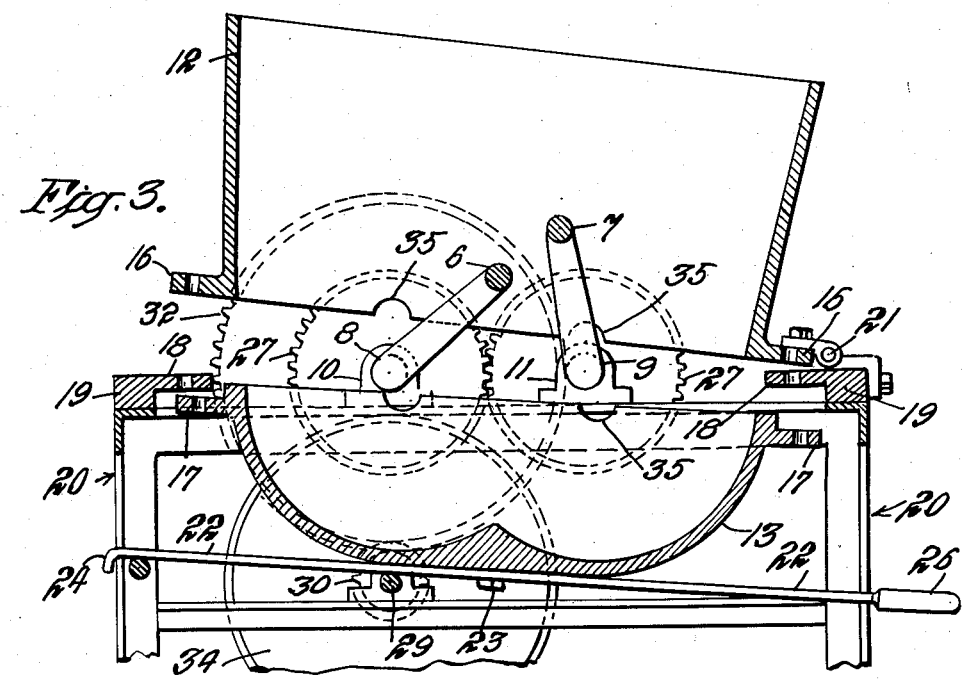
Figure 3 is a broken sectional view similar to Fig. 1, but showing fastenings released and the hopper and bowl separated for cleaning of the beaters or other such purposes.
Figure 4:
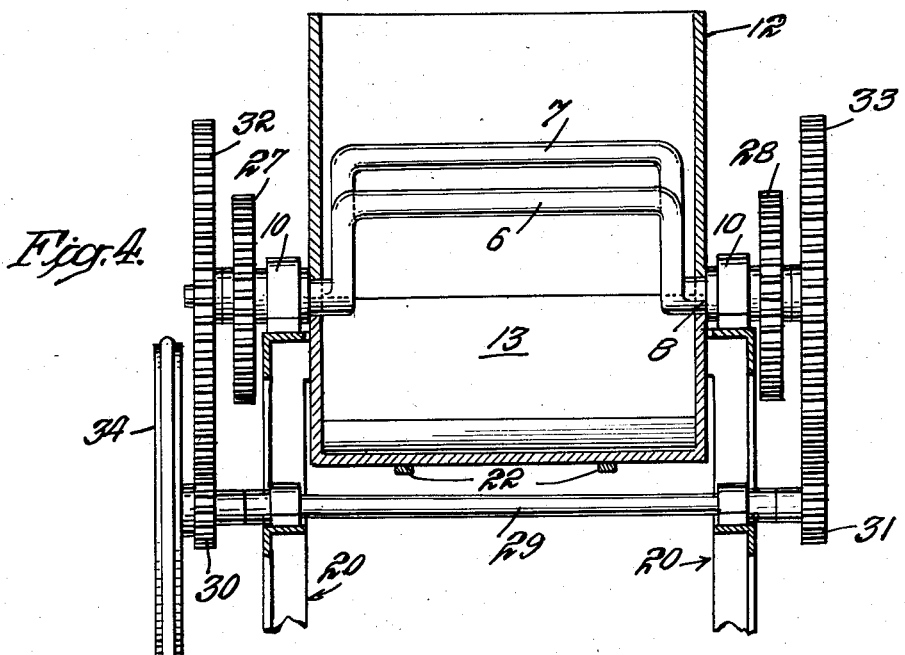
Fig. 4 is a broken vertical sectional view on substantially the plane of line 4—4 of Fig. 1.

In Figs. 1 and 2, it will be seen that the machine comprises a pair of arched beaters 6 and 7, carried by parallel shafts 8, 9, journalled in fixed bearings 10, 11, and operating in a mixing and kneading chamber composed of an upper, hopper section 12, and a lower bottom or bowl section 13.

The two hopper sections separate on a horizontal line 14, intersecting the shaft centers and they are removably secured in their combined relation by bolts 15, extending through outstanding flanges 16, 17, on said sections and through intermediate supporting flanges 18, on the open table top 19, of the frame 20.

The upper hopper portion 12, is shown hinged to the supporting frame at one side at 21, so that it may, when the securing bolts are released, be swung upwardly as shown in Fig. 3.

With this construction, it is possible, upon releasing the securing bolts 15, to drop the lower, bowl bottom and to swing the upper hopper section away and off to one side, so as to gain full access to the bowl and so as to fully expose the beaters for cleaning and other purposes.

To assist in lowering the hopper bottom and in replacing it, two hand levers 22, are shown bolted to the bottom, intermediate their length as indicated at 23, and having their inner ends hooked at 24, over a rod 25, on the frame and their outer ends projected in the form of handles 26, which may be grasped in the two hands of a person servicing a machine.

In lowering the bottom of the hopper, the hand levers 22, may be left hooked over the supporting rod 25, as shown in Fig. 3, to support the bottom in an inclined position convenient for scouring and cleaning or the hooked ends 24, may be disengaged from the supporting rod and the bottom be removed entirely from the frame of the machine.

The beater arms may be of any desired form and shaped to accomplish the mixing and kneading results desired.

To enable this selection of beater form or structure, the beater shafts are geared together and driven at both ends. This equalizes strain and balances forces so that the beater arms may be shaped as thin blades or the like, which otherwise might not be considered strong enough to stand the mixing and kneading operations.

The companion pairs of gears at the opposite ends of the shafts are indicated at 27, 28.

To further carry out the balancing of loads and forces, the drive shaft 29, journalled in the frame below the bowl is geared at both ends to both ends of one of the beater shafts, being shown as having pinions 30, 31, at opposite ends engaging gears 32, 33 on opposite ends of beater shaft 8.

Power is applied to drive shaft 29, in the present illustration by belt pulley 34, on the end of that shaft.

This construction provides a quiet, smooth running combination with power applied equally to opposite ends of the beater shafts.

The shaft bearings 10 and 11, may be of the fully enclosed self-lubricated anti-friction type, so as to require no attention and so as to be completely sealed from the hopper. The upper and lower sections of the hopper therefore need only have complemental shaft receiving recesses 35, Fig. 3, in their meeting edges.

The machine consists of but relatively few parts and can be produced at low cost. All working parts are balanced so power consumption is low. Cleaning, inspection or possible repairs can be readily effected because of the quick separability of the hopper and the leaving of the beater shafts always in the same geared together relation. The two hand levers afford a safe and easy way for lowering the hopper bottom and provide a convenient and safe means for lifting and holding the bottom up in position, while the fastening bolts are being re-applied.

What is claimed is:

Dough mixing and kneading machine, comprising a frame having an open table top, parallel fixed bearings on said frame at opposite ends of said table top, beater shafts including beaters journalled in parallel relation in said bearings, a hopper comprising upper and lower sections separable on a line coinciding with said table top, the upper hopper section having side flanges resting on said table top and the lower hopper section having flanges engaging the underside of said table top, fastenings extending through said flanges and portions of the table top intermediate the same securing said hopper sections in assembled but relatively separable relation independently of the beater shafts, intermeshing gears on the outer ends of said beater shafts at the outer sides of the fixed bearings, drive gearing connected in driving relation with said interconnected beater shafts and leverage means connected with the lower hopper section for lowering or raising the same in respect to the table top and having an operating handle located at the front of the machine for effecting raising and lowering of said lower hopper section from a position at the front of the machine clear of the gearing described.

References Cited in the file of this patent

UNITED STATES PATENTS

| | | |
|---|---|---|
| 426,738 | Pickett | Apr. 29, 1890 |
| 921,361 | Chambers | May 11, 1909 |
| 1,229,934 | Gensheimer | June 12, 1917 |
| 2,559,418 | Ford | July 3, 1951 |
| 2,757,912 | Madsen | Aug. 7, 1956 |

FOREIGN PATENTS

| | | |
|---|---|---|
| 161,412 | Germany | June 23, 1905 |